UNITED STATES PATENT OFFICE.

WILLIAM ROY MOTT, OF LAKEWOOD, OHIO, ASSIGNOR TO NATIONAL CARBON COMPANY, INC., A CORPORATION OF NEW YORK.

COMPOSITION FOR PRODUCING COATINGS ON REFRACTORY ARTICLES AND ARTICLES COATED THEREWITH.

1,425,603.  Specification of Letters Patent. Patented Aug. 15, 1922.

No Drawing.  Application filed January 14, 1919. Serial No. 271,123.

*To all whom it may concern:*

Be it known that I, WILLIAM R. MOTT, a citizen of the United States, residing at Lakewood, in the county of Cuyahoga and State of Ohio, have invented a certain new and useful Improvement in Compositions for Producing Coatings on Refractory Articles and Articles Coated Therewith, of which the following is a full, clear, and exact description.

This invention relates to compositions for forming protective coatings on refractory articles, such as firebricks, electrodes, resistor blocks, etc. The invention also comprises refractory articles provided with protective coatings.

Carbon is a very desirable element for refractory articles on account of its extremely high vaporization point. Unfortunately, however, carbon very readily combines with oxygen even at fairly moderate temperatures, and therefore combustion readily takes place in oxygen-containing atmospheres unless some protecting means is employed to prevent the oxygen reaching the carbon. For this reason various coatings have been proposed for the carbon refractory articles, but as far as I am aware, none of them have been satisfactory at temperatures in the neighborhood of 1500° C. or more.

I have found that a very efficient protecting means may be obtained by coating a carbon or graphite article with a mixture of boric oxide ($B_2O_3$) and compounds of iron and chromium such as the oxides for example. The protecting action of boric oxide alone is good up to 1500° C., as the molten oxide readily wets either cold or incandescent carbon and flows evenly over its surface. The boric oxide-iron-chromium mixture therefore protects the carbon article chiefly through the boric oxide up to 1500° C., although the oxides of iron and chromium are reduced by the carbon to metallic iron and chromium below this temperature, which form an alloy that is very resistant to oxidation and which tends to form a dense coating on the carbon. Therefore the iron and chromium aid boric oxide in the protecting action up to 1500° C., and somewhat above this temperature the boric oxide partly vaporizes, leaving the partly molten alloy which contains chiefly iron, chromium carbide and boron carbide, as a thin coating on the exterior part of the carbon. This molten coating also wets the carbon and prevents the oxygen from reaching the carbon.

At temperatures in the neighborhood of 1700° C. the iron and chromium probably unite with the carbon to form a double carbide in the form of a dense, impervious coating which I have found to protect the carbon at temperatures even as high as 3000° C. It therefore will be apparent that the boric oxide-iron-chromium glaze or coating will protect the carbon article to any temperature up to 3000° C. If the carbon article has once been raised to a temperature above 1700° C., so that the double carbide is formed, and is afterwards used at temperatures below 1700° C., the protecting action is still obtained, as the double carbide coating will protect at the lower temperatures as well as at the higher ones.

There are various ways of applying the coating to carbon articles, one of which is to dissolve the oxides of iron and chromium in molten boric oxide and then dip the cold or hot carbon article therein. On removal the article will be coated with an adherent glaze that will protect it in the manner previously explained.

An alternative method is to paint a mixture of the three oxides, with some temporary binder such as sodium silicate or sugar solution, directly onto the carbon article, and then bake the article sufficiently to form a glaze. The baking, however, may be accomplished by the heat to which the article is subjected in use.

Still another method is to mix the three oxides with the carbon forming the refractory article, so that on heating, the glaze will be formed on the exterior portion. This method will be especially desirable in forming resistor blocks or rods, as the oxides will aid in producing the desired resistance, carbon being in many cases of too high a conductivity.

While I have mentioned the use of the oxides in the protecting coating, various equivalents may be substituted. For instance sodium borate, metallic iron and chromium, as well as the salts of these elements, may be employed, although the lower cost would make it desirable to use the oxides as previously set forth. There is no particular proportion of the materials that is necessary, but good results may be obtained by coating the carbon article with a glaze consisting of 2 to 6 parts boric oxide, 1 to 3 parts iron oxide and 2 to 6 parts chromium oxide. If the oxides are homogeneously mixed with the carbon the proportions may be as follows: boric oxide, 2 to 10; iron oxide, 1 to 5; chromium oxide, 2 to 10; with sufficient carbon to make up 100 parts, for example. The oxides need not be homogeneously mixed with the carbon, but may be mixed therewith only on the outer surface, the mixture being pasted on the article, or the coating and electrode body may be forced together by extrusion in a well known way, for example as is disclosed in the French patent to Mignon and Rouart, No. 143,206, June 3, 1881. In case the carbon is mixed with the oxides, even as a homogeneous mixture or as a thin shell, a tar or pitch binder may be used as is usual in forming carbon articles, which on baking will be converted into coke and act as the binding means.

It will be apparent from the foregoing discription that the invention is not limited to carbon articles but may be used in connection with other articles such as resistors, bricks, etc., that are adapted to oxidize or react with the surrounding medium on being heated. In case the coating is to contain the carbides of the metals, an appropriate mixture of carbon and the oxides of boron, iron and chromium in any desired combination may be used.

Having described my invention, what I claim is:

1. As a new article of manufacture, a refractory article provided with a coating comprising an oxy-compound of boron, associated with iron and chromium.

2. As a new article of manufacture, a refractory article provided with a coating comprising an oxy-compound of boron, associated with oxids of iron and chromium.

3. As a new article of manufacture, a carbon article provided with a coating comprising an oxy-compound of boron, associated with iron and chromium.

4. As a new article of manufacture, a carbon article provided with a coating comprising an oxy-compound of boron, associated with oxids of iron and chromium.

5. A protective coating composition for carbon articles, said composition containing a component which is fusible at a temperature below the oxidation temperature of carbon in air, and which in the fused state readily wets carbon surfaces or forms a film thereon, said composition also yielding, at a higher temperature range, a protective residue or reaction product upon the carbon surface.

In testimony whereof, I hereunto affix my signature.

WILLIAM ROY MOTT.